(12) United States Patent
Eisner et al.

(10) Patent No.: US 9,158,020 B2
(45) Date of Patent: Oct. 13, 2015

(54) METHOD OF LOCATING A RECEIVER IN A WELL

(75) Inventors: Leo Eisner, Praha (CZ); Joel Le Calvez, Farmers Branch, TX (US)

(73) Assignee: Schlumberger Technology Corporation, Cambridge, MA (US)

( * ) Notice: Subject to any disclaimer, the term of this patent is extended or adjusted under 35 U.S.C. 154(b) by 1553 days.

(21) Appl. No.: 12/600,480

(22) PCT Filed: Jul. 2, 2008
(Under 37 CFR 1.47)

(86) PCT No.: PCT/GB2008/002271
§ 371 (c)(1),
(2), (4) Date: Jun. 21, 2010

(87) PCT Pub. No.: WO2009/004333
PCT Pub. Date: Jan. 8, 2009

(65) Prior Publication Data
US 2011/0069584 A1 Mar. 24, 2011

(30) Foreign Application Priority Data
Jul. 3, 2007 (GB) .................................. 0712883.8

(51) Int. Cl.
G01V 1/00 (2006.01)
G01V 1/40 (2006.01)

(52) U.S. Cl.
CPC .......................................... *G01V 1/40* (2013.01)

(58) Field of Classification Search
CPC ....................................................... G01V 1/40
USPC ................................ 367/99, 118, 124; 702/14
See application file for complete search history.

(56) References Cited

U.S. PATENT DOCUMENTS

| 4,641,287 | A | * | 2/1987 | Neeley ............................. 367/19 |
| 5,128,904 | A | | 7/1992 | Chambers |
| 5,166,905 | A | | 11/1992 | Currie |
| 5,917,160 | A | | 6/1999 | Bailey |
| 6,748,330 | B2 | | 6/2004 | Leaney |
| 7,082,993 | B2 | | 8/2006 | Ayoub et al. |
| 7,391,675 | B2 | * | 6/2008 | Drew ............................... 367/73 |
| 7,872,944 | B2 | | 1/2011 | Eisner et al. |
| 2003/0197645 | A1 | | 10/2003 | Ninomiya et al. |
| 2004/0220722 | A1 | | 11/2004 | Taylor |

FOREIGN PATENT DOCUMENTS

| EP | 0007769 A2 | 2/1980 |
| EP | 0007789 | 2/1980 |
| EP | 1324076 A2 | 7/2003 |
| GB | 2277152 A | 10/1994 |
| GB | 2379505 A | 3/2003 |

(Continued)

OTHER PUBLICATIONS

Rivera8 Tutorial, 1996, http://rayfract.com/tutorials/riveral8.pdf.*

(Continued)

*Primary Examiner* — Krystine Breier

(57) ABSTRACT

A microseismic method of determining the position of a downhole receiver (4) making use of received signals from events (21, 22) at least two known locations using the equivalent of a Thales circle construction from two or more pairs of events.

11 Claims, 5 Drawing Sheets

(56) References Cited

FOREIGN PATENT DOCUMENTS

| | | |
|---|---|---|
| GB | 2387440 A | 10/2003 |
| GB | 2444954 | 6/2008 |
| JP | 2006234683 A | 9/2006 |
| WO | 9609561 A1 | 3/1996 |
| WO | 0144829 A2 | 6/2001 |
| WO | 03054567 A2 | 7/2003 |
| WO | 03054587 | 7/2003 |
| WO | 2006030310 A2 | 3/2006 |

OTHER PUBLICATIONS

Bulant et al., "Borehole Deviation Surveys Are Necessary for Hydraulic Fracture Monitoring," Society of Petroleum Engineers, 2006 SPE Annual Technical Conference and Exhibition, Sep. 2006, SPE 102788: pp. 1-12.

Bulant et al., "Importance of borehole deviation surveys for monitoring of hydraulic fracturing treatments," Geophysical Prospecting, vol. 55, 2007: pp. 891-899.

Cerveny, "2.4: High-Frequency Elastic Waves in Smoothly Inhomogeneous Media," Seismic Ray Theory, New York: Cambridge University Press, 2001: pp. 57-59 and 62-63.

Eisner et al., "Borehole Deviation Surveys Are Necessary for Hydraulic Fracture Monitoring," vienna2006, EAGE 68th Conference & Exhibition, Jun. 2006: pp. 1-5.

Maxwell et al., "Real-Time Microseismic Mapping of Hydraulic Fractures in Carthage, Texas," Society of Exploration Geophysicists, 2000 SEG Annual Meeting, Aug. 2000, Expanded Abstracts: pp. 1-4.

Moriya et al., "Precise source location of AE doublets by spectral matrix analysis of triaxial hodogram," GEOPHYSICS, 1994, vol. 59(1): pp. 36-45.

Pearson, "The Relationship Between Microseismicity and High Pore Pressures During Hydraulic Stimulation Experiments in Low Permeability Granitic Rocks," Journal of Geophysical Research, Sep. 1981, vol. 86(B9): pp. 7855-7864.

Phillips et al., "Induced microearthquake patterns and oil-producing fracture systems in the Austin chalk," Tectonophysics, 1998, vol. 89: pp. 153-169.

Rümpker et al., "A Maslov-propagator seismogram for weakly anisotropic media," Geophys. J. Int., 2002, vol. 150: pp. 23-36.

Rutledge et al., "Hydraulic stimulation of natural fractures as revealed by induced microearthquakes, Carthage Cotton Valley gas field, east Texas," GEOPHYSICS, 2003, vol. 68(2): pp. 441-452.

Sun et al., "2-D wavepath migration," GEOPHYSICS, 2001, vol. 66(5): pp. 1528-1537.

Vanelle et al., "Application of sectorially best-fitting isotropic background media," SEG Int'l Exposition and 74th Annual Meeting, Oct. 2004: pp. 1-4.

Zheng et al., "Local Determination of Weak Anisotropy Parameters from qP-wave Slowness and Particle Motion Measurements," Pure appl. geophys., 2002, vol. 159: pp. 1881-1905.

Combined Search and Examination Report of British Application Serial No. 0712883.8 dated Oct. 19, 2007.

International Search Report and Written Opinion of PCT Application Serial No. PCT/GB2008/002271 dated Oct. 13, 2008.

Bulant et al., "Importance of borehole deviation surveys for monitoring of hydraulic fracturing treatments," Geophysical Prospecting, 2007, vol. 55: pp. 891-899.

* cited by examiner

METHOD OF LOCATING A RECEIVER IN A WELL

This invention relates to method for determining the position of a receiver or an array of receivers in inaccessible locations, particularly within subterranean boreholes. More specifically, it relates to such methods for the purpose of monitoring microseismic events.

BACKGROUND OF THE INVENTION

In microseismic monitoring the seismic energy is generated through so-called local microseismic events either naturally occurring in the formation or caused by human activity or intervention. The events include seismic events caused by fracturing operations, by very small sources injected for example with wellbore fluids, or background events illuminating the area of interest.

Apart from the problem of detecting the often faint microseismic events, their interpretation is difficult as neither in microseismics the source location nor the source signature or characteristics are known a priori. However knowledge of these parameters is essential to deduce further reservoir parameters knowledge of which would improve reservoir control. If the precise location of the source or event which caused a seismic wave is required for the further processing and interpretation of the recorded signals or data, then such location has to be inferred from the recordings.

A specific field within the area of passive seismic monitoring is the monitoring of hydraulic fracturing operations. To improve production or storage capacity of underground reservoirs, the operators often perform a procedure known as hydraulic fracturing. Hydraulic fracturing operations are for example commonly performed in formations where oil or gas cannot be easily or economically extracted from the earth.

A hydraulic fracturing operation includes the steps of pumping through a borehole large amounts of fluid to induce cracks in the earth, thereby creating pathways via which the oil and gas can flow more readily than prior to the fracturing. After a crack is generated, sand or some other proppant material is commonly injected into the crack, such that a crack is kept open even after release of the applied pressure. The particulate proppant provides a conductive pathway for the oil and gas to flow through the newly formed fracture into the main wellbore.

In the field of hydraulic fracturing monitoring (HFM) and in the general field of microseismic monitoring, usually arrivals of P- and/or S-waves are registered from a single or more vertical monitoring arrays. The measurements are then evaluated to determine or constraining for example the event depth and distance from the monitoring array. The polarization of the P waves can be used to determine the vertical plane in which the source is located. The vertical plane is often reduced to a single direction known as azimuth of the source or back-azimuth of the source. Currently, the microseismic events are usually located with the back-azimuth derived from P waves with distance and depth constrained by the timing of arrivals of P- and S-waves.

However, the hydraulic fracturing process and other microseismic events are difficult to monitor, since they are typically thousands of feet below the surface of the earth. Furthermore, in cases where the receivers for the microseismic survey are located inside wellbores additional uncertainties arise which are part of the background to this invention.

Details of known microseismic monitoring methods can be found for example in for example the following publications:

Maxwell S. C., Urbancic T. I., Falls S. D., Zinno R.: "Real-time microseismic mapping of hydraulic fractures in Carthage", Texas, 70th Annual International Meeting, SEG, Expanded Abstracts, 1449-1452 (2000);

Moriya, H., K. Nagano and H. Niitsuma: "Precise source location of AE doublets by spectral matrix analysis of the triaxial hodogram", Geophysics, 59, 36-45 (1994);

Pearson, C: "The relationship between microseismicity and high pore pressures during hydraulic stimulation experiments in low permeability granitic rocks", Journ. Of Geophys Res. 86 (B9), 7855-7864 (1981);

Phillips W. S., T. D. Fairbanks, J. T. Rutledge, D. W. Anderson: Induced microearthquake patterns and oil-producing fracture systems in the Austin chalk. Tectonophysics, 289, pp. 153-169 (1998); and Rutledge, J. T. and Phillips, W. S. (2003): Hydraulic stimulation of natural fractures as revealed by induced microearthquakes, Carthage Cotton Valley gas field, east Texas. Geophysics, 68, 441-452.

Referring no more specifically to the background and object of the present invention, it should be appreciated that for most purposes microseismic event monitoring requires accurate knowledge of the receiver locations and orientations. If the receivers are placed in a borehole, these locations are generally derived from (i) cable depth and (ii) deviation surveys, i.e., the measurements of the borehole inclination and azimuth. The cable depth is generally well accessible from surface measurements on the deployment cable though uncertainty of the true cable length may arise from various sources such as cable stretching due to temperature, weight, etc. However, well deviation surveys are either (i) unknown in which case the well is assumed to be vertical, (ii) partially unknown such that inclination is known but not the azimuth, or (iii) poorly defined (e.g., by having positions and orientations only coarsely sampled or missing survey points or similar errors in the existing data set of a well.

Any error in the assumptions relating to the position of sensors or receivers can create significant errors in the locations of the microseismic events. This statement has been confirmed for example in:

Bulant P., Eisner L., Ivan Pšenčík and Joël Le Calvez: "Borehole Deviation Surveys Are Necessary for Hydraulic Fracture Monitoring", SPE abstract 102788 (2006).

Thus, the conclusion can be drawn that for nearly vertical wells the lack of the deviation surveys significantly affects horizontal position of the monitoring array, while the uncertainty in the vertical position is usually a lesser problem in the data evaluation.

In the light of the above, the present invention seeks new methods for determining the position of subterranean receivers, particularly to reduce the uncertainty about the azimuth of such positions.

SUMMARY OF THE INVENTION

The invention describes a method of identifying the horizontal position of a seismic receiver or an array of seismic receivers using said receiver to determine directions of at least two seismic events at different known locations; and using said directions and said locations to derive an estimate of the receiver position. The method includes preferably the step of determining the back azimuth of the seismic events and for that makes preferably use of the particle polarization of seismic waves emanating from spatially distributed seismic events.

In a preferred embodiment of the invention, the method includes the step of deriving an estimate of the receiver position by evaluating the circumference of Thales' circles construed using the known locations and the relative angle of incidence at the receiver for a pair of the seismic events.

This technique is particularly suitable for horizontally distributed perforations and vertical observation arrays. The technique can be combined with travel-time measurements to achieve higher accuracy of the monitoring array relocation.

The method can also be used to determine the location of sensors in field such as monitoring scenarios in the mining, nuclear and waste storage industry or any other monitoring operations where the exact position of the recording sensor is not exactly known but of interest for the further evaluation of the recorded data.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

In the following example of the invention it is assumed that the novel method is applied in the field of monitoring hydraulic fracturing with microseismic methods. In hydraulic fracturing monitoring the fracture geometry can be in principle determined from hypocentral locations of the microseismic events as observed from one or more monitoring boreholes.

Figure 1A:
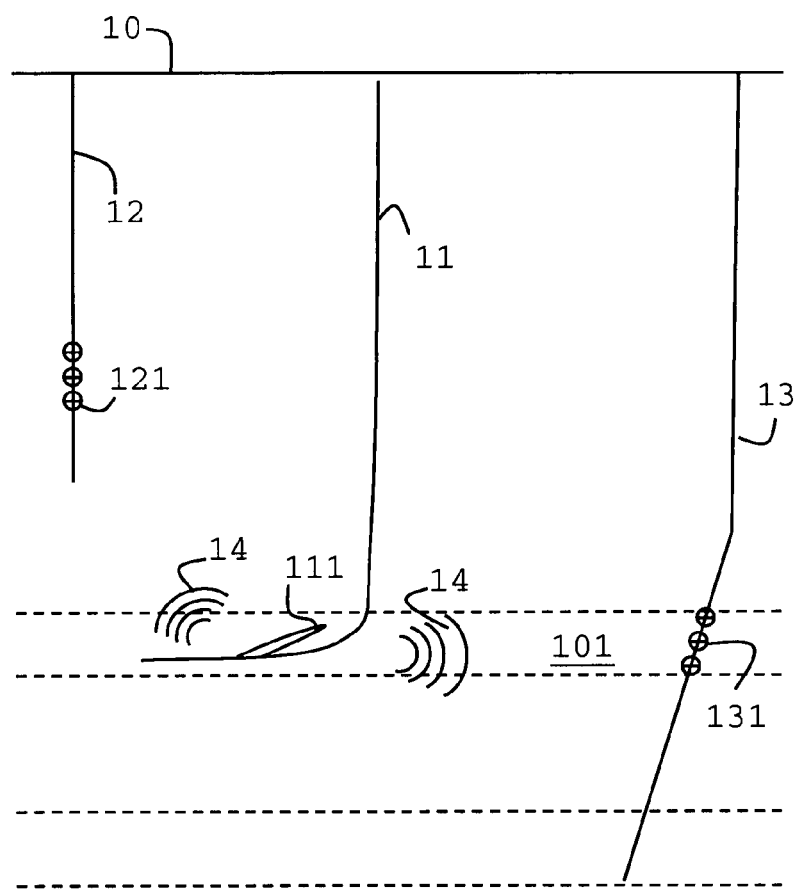
FIGS. 1A and 1B show a schematic illustration of a conventional fracturing monitoring operation using microseismics and a perforation operation, respectively, monitored by an array of receivers in a neighboring wellbore.

A typical operational setting for monitoring hydraulic fracturing is schematically illustrated in FIG. 1A with a treatment well 11 shown and geophone arrays 121, 131 located in neighboring boreholes 12, 13. These neighboring wells are generally referred to as monitoring wells.

During the fracturing operation, a fluid is pumped from the surface 10 into the treatment well 11 causing the surrounding formation to fracture at the level of the hydrocarbon bearing layer 101. Seismic waves 14, such as P-waves and S-waves, generated by the fracture 111 propagate through the earth and are recorded using three-components geophones making up each of the two arrays 121, 131 in the monitoring wells 12, 13.

Figure 1B:
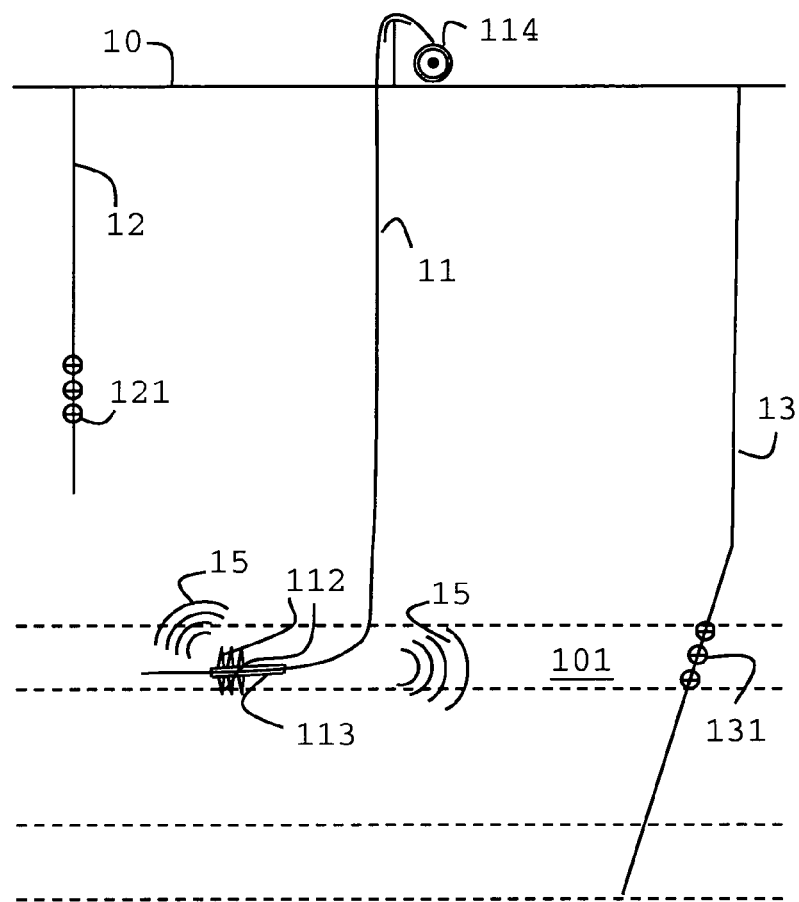

In FIG. 1B, the microseismic monitoring is extended for the purpose of this example of the invention to monitoring perforation shots. In a perforation operation, seismic waves 15 are caused by exploding downhole charges 112 from a perforation tool 113. The other elements of FIG. 1B are identical to those described in FIG. 1A and hence carry the same numerals.

One important difference between the two operations illustrated by FIGS. 1A and 1B, respectively, is that the locations of the perforation tool 113 and the shaped charges can be to some degree of accuracy measured from the surface deployment equipment 114. Furthermore, a horizontal well usually undergoes a deviation survey prior to the perforation treatment, hence the positions of the perforation shots are at least approximately known. Thus the time and origin of the microseimic events is much better defined than in fracturing monitoring.

For the purpose of the present invention it should be noted that perforation shots are taken herein only as one example of seismic events, the location of which are known with sufficient degree of accuracy to be used in the new methods. Any other seismic event with a known location can be used in the steps described below.

As described in the introduction, the monitoring or the treatment wells are often found to be not strictly vertical. Such a case is illustrated by borehole 13 in FIG. 1. Given that for most wells the exact trajectory is not available, any deviation from the known or assumed trajectory can cause significant errors in the determination of locations of microseismic events. It would be of course possible to perform borehole deviation surveys to reduce or eliminate these errors. In a deviation survey the borehole inclination and azimuth is measured and used to calculate the borehole trajectory. Such surveys are however not always available and add costs to the fracturing operation. Further there is usually no orientation measuring device connected to the monitoring array.

However, as proposed in this example, the orientation of a monitoring array can be determined from back-azimuths of P waves generated for example by perforation shots in the treatment well.

The difference in back-azimuths (or particle motion directions) of distributed seismic events such as the perforation shots in the treatment well described above in FIG. 1B or other events with known source locations can be used to constrain the likely receiver location.

When evaluating the signals recorded, the present invention makes use of the fact that rays arriving from two sources or events with spatially different locations (relative to the source-receiver distance) will arrive with two different directions at a selected receiver. The difference in ray directions will result in difference in particle motion (either P or S-waves) which can be directly measured at the receivers.

Typically, P-waves are polarized in direction of the rays. Hence a multi-component receiver which can resolve the P-wave polarization can be used to determine the ray direction of the incoming P-wave. For further details of this step reference is made to the co-owned GB application 0625343 filed on the 20 Dec. 2006 and having the title "Method of Monitoring Microseismic Events" and further references cited therein.

For any phase (P, S or any other phase), ray propagation can be assumed to be along straight lines between the origin of the seismic wave and the receiver, particular if the propagation is located within a horizontal plane of an isotropic, a laterally isotropic, or transverse isotropic medium with vertical axis of symmetry, also known as VTI medium.

The measurement can even be preformed in non-VTI medium provided the velocity model of the surrounding formation or equivalent information is known together with the travel-times of the waves from the source location to the receivers. However for most applications, the back-azimuth measurement is either independent of the velocity model and typically assumes only lateral homogeneity or a VTI medium as stated above.

Once the ray directions at the receiver have been determined, the measured back-azimuth difference at each receiver can be used to construct possible locations of the receiver. In the present example these possible locations are found using a Thales' circle construction.

Using for example two waves with an origin at the horizontal position $\vec{x}_1$ and $\vec{x}_2$, the Thales' circle has semi-radius $$r=|\vec{x}_1-\vec{x}_2|/\sin(\omega), \quad [1]$$

where $\omega$ is back-azimuth difference of two rays arriving from sources at $\vec{x}_1$ and $\vec{x}_2$. The centers of the Thales' circles are $$\vec{c}_i=(\vec{x}_1+\vec{x}_2)/2+r\cdot\cos(\omega)\vec{u}_i, \quad [2]$$

where $\vec{u}_i$ are vectors perpendicular to the vector $(\vec{x}_1-\vec{x}_2)$.

Thus for each pair of locatable microseismic events and measured back-azimuth difference two Thales' circles can be constructed corresponding to the two centers given by eq. [2] and with the radius of eq. [1].

Selecting multiple events, the intersection of the Thales' circles at a receiver position can be determined.

In the general case, four solutions exist satisfying the observed the back-azimuth difference. It is usually possible to distinguish between these solutions as only one solution is likely to be close to the approximate location of the monitoring array, i.e. the trajectory of the borehole as known.

Using a second pair of sources, the four possible solutions can be further reduced (to the one unique solution). Hence the above ambiguity of the solution can be removed using events at three known source positions.

Figure 2:
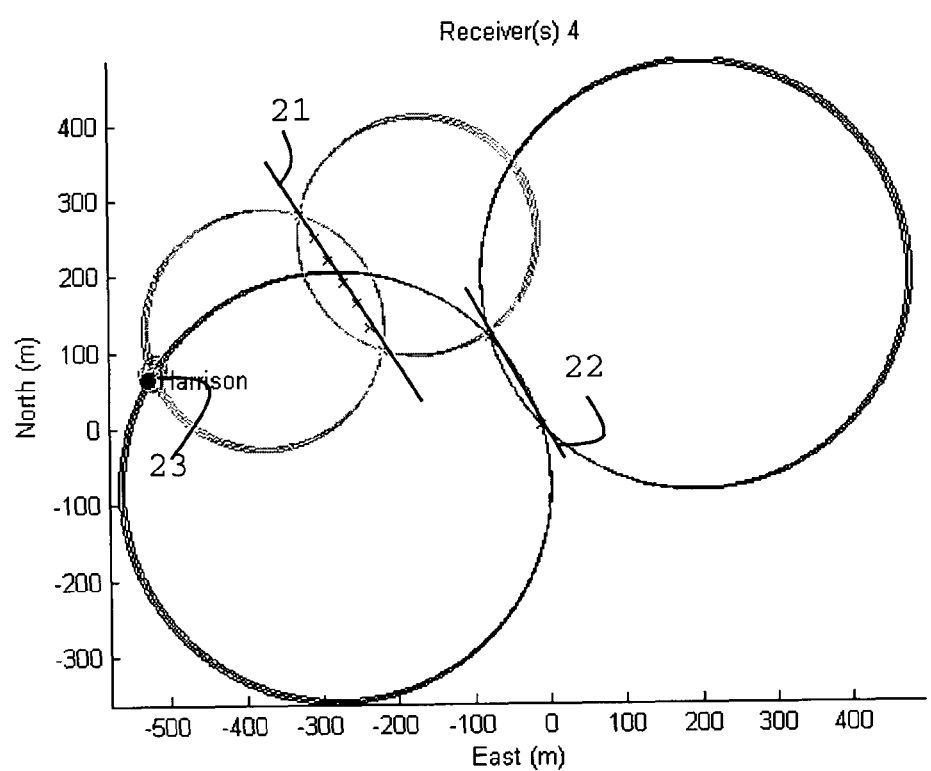
FIG. 2 illustrates an application of the present invention.

In FIG. 2, there is shown a map view to illustrate the invention as applied to define the receiver locations in a nominally vertical monitoring well 23 in the vicinity of two horizontal treatment wells. The two horizontal sections of the treatment wells as indicated by lines 21 and 22.

For a given pair of sources and back-azimuth difference two Thales' circles 24 are drawn. To represent the uncertainty in the measured back-azimuth difference, these circles have an additional inner and outer circle for each pair of source, thus resulting in a graph with six circles for each of the two selected pairs of perforations. Thus there are 15 intersections in FIG. 2 and based on estimated maximum deviation for this measured depth of the monitoring borehole, the intersections 25 closest to the nominal position of the monitoring are selected.

For the example of FIG. 2, it can be concluded that within the uncertainty of the measurement the monitoring well does not seem to significantly deviate and the monitoring array appears to be located directly under the wellhead.

Figure 3:
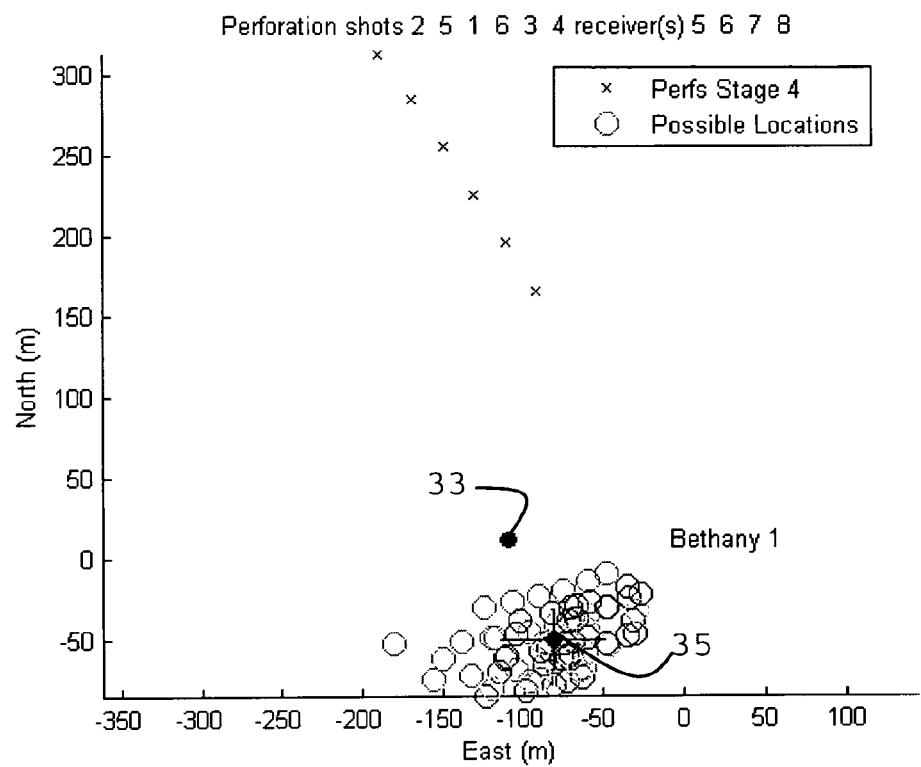
FIG. 3 illustrates a result of the application of another variant of the present invention.

Another graph as shown in FIG. 3 represents the results of a similar measurement in a different borehole. The nominal position of this well is taken as the position of the wellhead 33. In this experiment, the monitoring array is situated close to the end of the line of sources, i.e. the perforations shots and the Thales' circles for various combinations of source pairs almost overlap. The overlap can in some cases prevent an accurate location of the receiver position. Therefore in a further refinement of the present invention, traveltimes of S-P waves are used to further constrain the horizontal location of the monitoring array. The traveltimes are readily available as the timing of the events registered is well defined.

Even in view of the uncertainty of the new location as indicated by the cluster 35 of small circles, it is recognizable that the center of the cluster and hence the probable position of the monitoring array is located approximately 57 m SSE of its assumed or well-head position 33.

Figure 4:
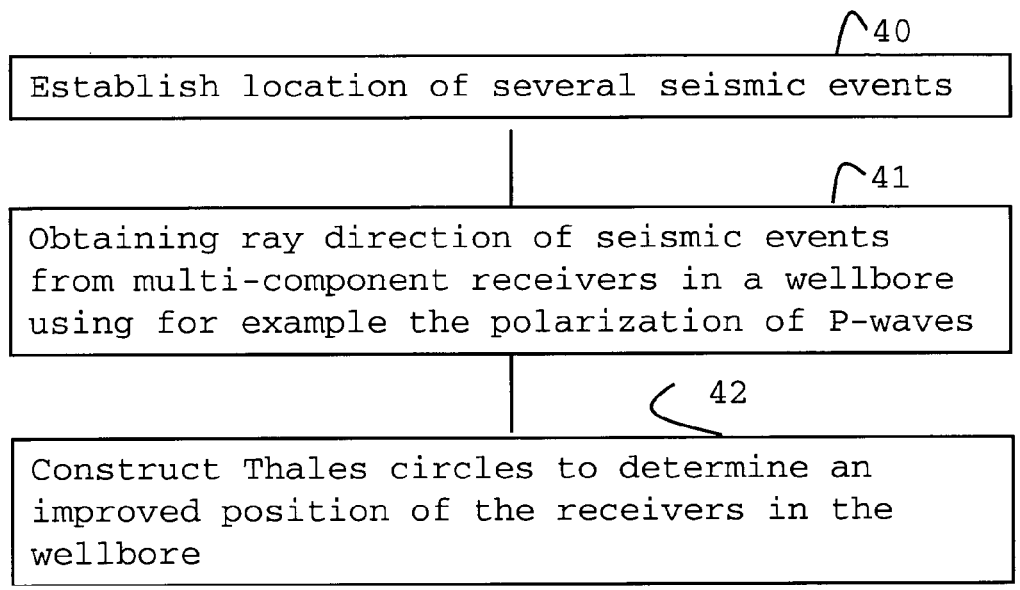
FIG. 4 is a flowchart with steps in accordance with an example of the present invention.

The above steps are summarized as steps 40-42 in FIG. 4.

The invention claimed is:

1. A method of determining the position of a subterranean receiver located in a monitoring borehole, comprising:
    using said receiver to determine directions of at least two seismic events at different known locations, wherein determining the directions includes determining the back azimuth of the at least two seismic events; and
    using said directions and said locations to derive an estimate of the receiver position.

2. The method of claim 1 wherein determining the directions includes the use of prior knowledge of seismic velocities of earth layers between the location of the at least two seismic events and the receiver.

3. The method of claim 1 wherein determining the directions includes measuring the polarizations of P-waves as emanating from the at least two seismic events.

4. The method of claim 1 wherein deriving an estimate of the receiver position includes determining the relative angle between two events at the receiver.

5. The method of claim 1 wherein deriving an estimate of the receiver position includes determining the relative angle of incidence at the receiver for pairs of seismic events with known locations and evaluating the circumference of Thales circles construed using the known locations and the said relative angle of incidence at the receiver for pairs of seismic events with known locations.

6. The method of claim 1 wherein the receiver is an array of receivers.

7. The method of claim 1 wherein the receiver is a multi-component receiver capable of determining at least two independent spatial components of seismic wave amplitudes.

8. The method of claim 7 wherein the receiver is a three-component receiver capable of determining three independent spatial components of seismic wave amplitudes.

9. The method of claim 1 wherein the seismic events are perforation shots in one or more boreholes in the vicinity of the monitoring borehole.

10. The method of claim 1 using at least three seismic events at three distinct locations.

11. The method of claim 1, further comprising the step of using traveltime measurements to constrain possible positions of the receiver.

* * * * *